W. H. MAIN.
Combined Harrow and Seed Drill.
No. 21,265. Patented Aug. 24, 1858.
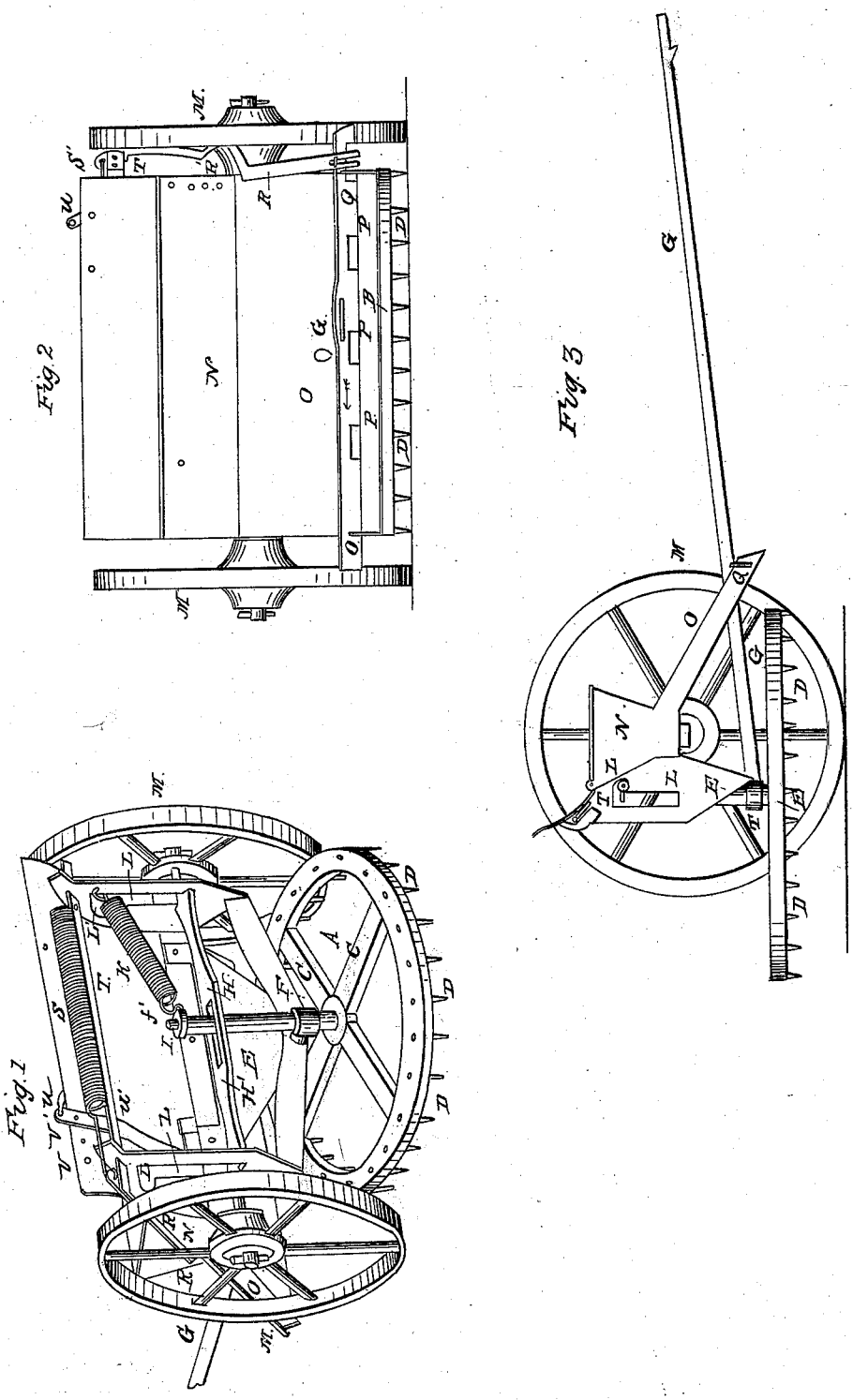

UNITED STATES PATENT OFFICE.

W. H. MAIN, OF LIVERPOOL, OHIO.

IMPROVEMENT IN ROTARY HARROWS.

Specification forming part of Letters Patent No. 21,265, dated August 24, 1858.

*To all whom it may concern:*

Be it known that I, WILLIAM H. MAIN, of Liverpool, in the county of Medina and State of Ohio, have invented new and useful Improvements in Rotary Harrows Combined with Seeding-Machines; and I do hereby declare that the following is a full and complete description of the construction and operation of the same, reference being had to the accompanying drawings, making part of this specification.

The nature of my invention consists in the construction of a harrow that may be used in combination with or separate from a seeding-machine, so that when desirable the harrow may be used without the seeder.

Figure 1 is a perspective view of the harrow and seeding-machine combined. Fig. 2 is a front view, showing the apparatus for the discharge of the grain. Fig. 3 is an end view, showing the manner of attaching the nep to the standard of the harrow.

A, Fig. 1, represents the harrow. This consists of a circular rim, B, and arms C, which cross at right angles, if but four arms are used; but more may be used, if desired. The teeth D are inserted through the rim in the manner shown in the figure. At the intersection of the arms C a standard, E, rises about three feet. This standard is rigidly attached to the arms C, and after passing through the flat ring F, on the back end of the nep G, in which ring F the standard E revolves, it is supported by the adjustable cross-bar H, and having free play laterally in the slot H'. After passing the slot in this adjustable cross-bar, the standard rises a distance of about five or six inches, and is terminated by a collar, I, and secured by a pin. To one side of this collar I is attached a spiral spring, K, the opposite end of which is secured to the frame which supports the adjustable cross-bar H. This cross-bar can be moved upward in the slots L L, and in so doing the cross-bar H comes in contact with the collar I, and in this manner the harrow can be lifted from the ground, and if the cross-bar H is slipped into the recess L' L' the rotating harrow will be held above the ground. (Seen in Fig. 3.) The frame that supports the cross-bar H is attached to the axle-tree of the truck, the wheels of which are seen at M M' in the several figures.

The box N of the seeding-machine is mounted upon the axle-tree of the harrow-truck. The delivery-spout O reaches forward and downward, as seen in Figs. 2 and 3. The nep G passes through this spout at G'. The spout O has a width equal to the diameter of the circular harrow A. The seed is distributed upon the ground in front of the harrow through the orifices P P P, Fig. 2. These orifices are opened and closed by a slide, Q, which is operated conjointly by the lever R, coiled spring S, and the spokes of the wheel M, by means of the spokes striking against the angle R' upon the lever R. This drives the slide Q in the direction of the arrow and opens the orifices P and allows the seed to escape. At S' the spring S is attached to the short arm of the lever R, and the end S'' is attached to the slider T, Fig. 1. The action of this spring on the short arm of the lever R returns the slide Q to its original position and closes the orifices P. In this manner the orifices P are alternately opened and closed as the machine is drawn over the ground. An adjusting-lever, U, takes hold of the slider T at U', and by setting this adjusting-lever at the points V V', &c., the quantity of seed sown per acre can be regulated, or by carrying the adjusting-lever to the position seen at U, Fig. 1, the lever R is moved away from contact with the spokes of the wheel M, the orifices P are kept closed, and the machine can be moved from place to place without scattering the seed.

The manner the harrow operates is as follows: When the harrow is suffered to rest upon the ground, by releasing the cross-bar H from the recesses L' L', the coiled spring K draws the top of the standard E in a lateral direction—the spring K may be placed upon either side—and this causes the depressed side of the harrow to take a deeper hold of the ground than the other side, which causes the harrow to rotate as the machine is moved forward over the ground, the slide Q being at the same time operated in the manner described—namely, by the spokes of the truck acting upon the lever R—the seed is distributed upon the ground in front of the revolving harrow, and is immediately covered by its action; or, if it is desirable to harrow the ground without sowing seed, the orifices P can be entirely closed by moving the lever U, as described.

What I claim as my improvement, and desire to secure by Letters Patent, is—

1. The manner herein described for causing a harrow to rotate—namely, by means of the standard E, the slot H' in the bar H, and spring K, operating in the manner set forth.

2. The manner of raising the harrow from the ground by means of the adjustable bar H and recesses L' L', as described.

3. The several devices, combined as described, in combination with a seeding-machine, for the purpose set forth.

WM. H. MAIN.

Witnesses:
I. BRAINERD,
W. H. BURRIDGE.